June 10, 1941.  H. J. WADDELL  2,244,928
SELF-LUBRICATING VALVE
Filed Aug. 10, 1940   2 Sheets-Sheet 1
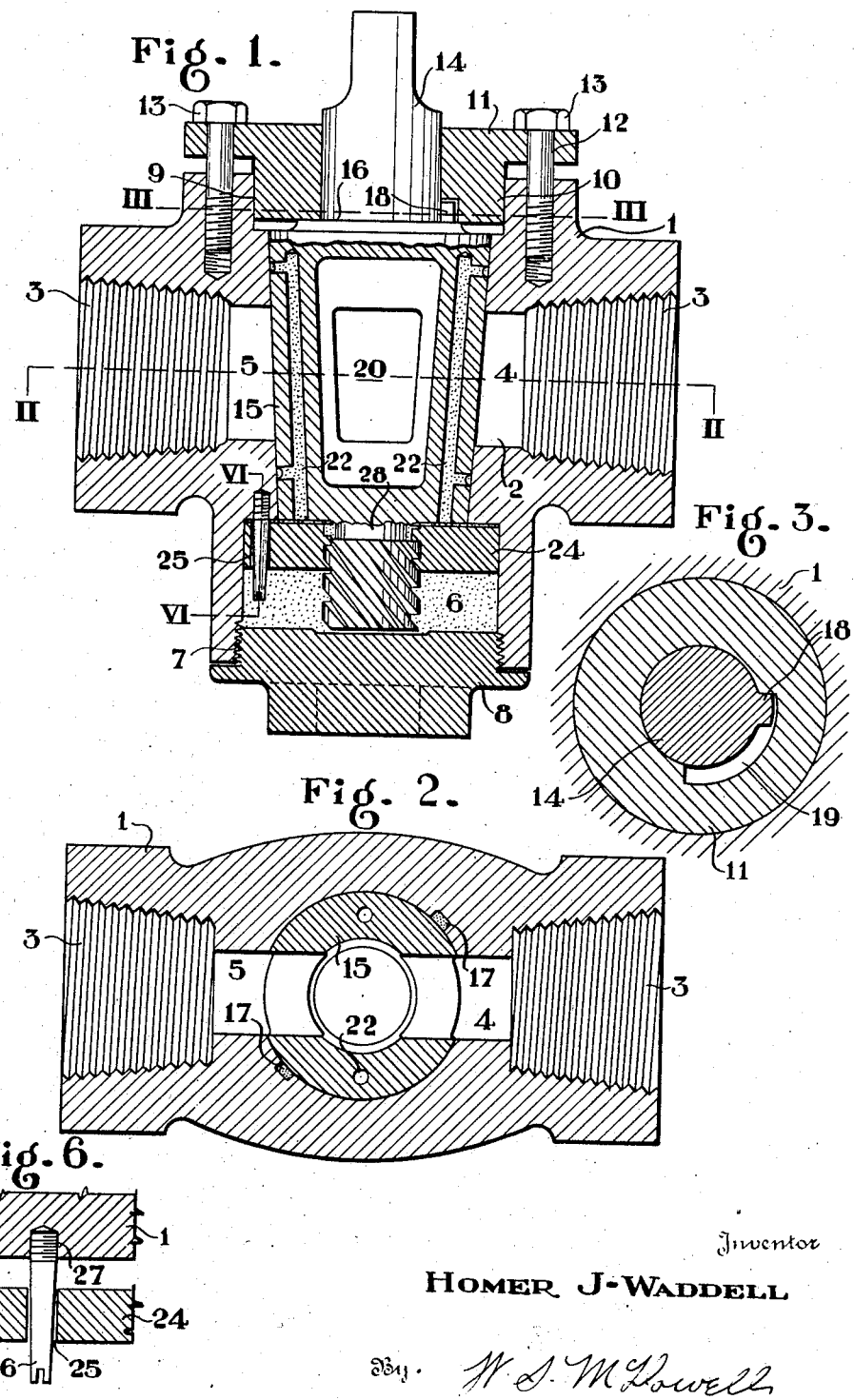
Inventor
HOMER J. WADDELL
By W. S. McDowell
Attorney June 10, 1941.  H. J. WADDELL  2,244,928
SELF-LUBRICATING VALVE
Filed Aug. 10, 1940   2 Sheets-Sheet 2

Inventor
HOMER J. WADDELL

By W. S. McDowell
Attorney

Patented June 10, 1941

2,244,928

UNITED STATES PATENT OFFICE 2,244,928

SELF-LUBRICATING VALVE

Homer J. Waddell, Baltimore, Ohio

Application August 10, 1940, Serial No. 352,095

11 Claims. (Cl. 251—93)

This invention relates generally to valves and is particularly directed to a valve of the plug type wherein means are provided to maintain a constant supply of grease or other semi-solid lubricating medium between the relatively movable parts of the valve.

In most valves heretofore, there has been either no means provided for lubricating the various parts or only such means as require close attention and the use of special tools, grease cups or oil cans. These requirements cause the lubrication of the valves to be neglected and as a result, they become difficult to operate.

The primary purpose of this invention is the provision of a plug valve which will avoid the above mentioned objections by being formed with means to keep the movable parts constantly supplied with a lubricating medium, and having means formed with the valve to cause the lubricating medium to flow under pressure to the desired points when the valve is actuated to control fluid flow therethrough.

An object also resides in providing a valve having a body and a plug, the latter being rotatably positioned in the former to control fluid flow therethrough, the socket in which the plug is positioned having grease grooves in open communication with a chamber wherein a piston is movably positioned, the piston serving to apply pressure to the grease and being connected with the plug in such manner that movement of the latter to open or close the valve will cause movement of the piston in the chamber.

A further object resides in disposing the aforementioned grease grooves in diametrically opposed relation and positioning them in close proximity to the inlet and outlet ports, the valve body also being provided with means to limit the degree of rotation of the plug in order to prevent the registration of the port in the plug with the grease grooves. Such a measure is essential since the lubricant is under pressure at certain times and if the port registered with the grooves, the grease might flow into the port and be wasted.

A still further object is to provide the inner end of the valve plug with spiral threads which receive a piston, the latter being non-rotatably positioned in a chamber in the valve at the inner end of the plug. Thus when the plug is revolved, the piston will be moved longitudinally of the chamber, the pitch of the threads being such that the piston will move substantially the full length of the chamber when the plug is rotated 90 degrees.

Another object resides in providing the body with tapered pins to serve as guide means for the piston, the pins being positioned in straight walled holes in the piston so that the amount of clearance between the pins and the walls of the openings will decrease as the piston approaches the end of its inward travel and increased pressure will be applied to the body of grease between the piston and the inner end of the chamber. Thus when the piston nearly reaches the end of its travel, the increased pressure will cause the grease to flow into the grooves in the socket wall and from there into the minute spaces between the plug and the valve body.

Another object resides in terminating the grease receiving recesses in spaced relation from the upper and lower ends of the socket in the body to provide a continuous ring-like seat at each end of the plug, the latter having longitudinally extending passages in open communication with the lubricant chamber and laterally extending ports to permit the lubricant to flow from the passages to the seats, the plug also being formed with annular grooves in registration with the lateral ports so that grease issuing therefrom may be conducted completely around the plug and be deposited upon the seats whereby the valve will be completely lubricated at all times.

It is an object also to provide a slightly different form of valve wherein the body is formed with a lubricant groove adjacent to one side of the inlet port and another groove adjacent to the opposite side of the outlet port, a plug being positioned in the body to control the flow from the inlet to the outlet port and having longitudinally extending grease grooves in the side surfaces, the latter grooves being so disposed that when the plug is in valve opening position, the groove therein will be positioned in a plane at right angles to that occupied by the grooves in the body, or in other words, the grooves in the plug will be disposed adjacent to the inlet and outlet ports but on opposite sides thereof from the grooves in the body. Thus when the plug is moved to a valve closing position, the grooves in the plug will substantially register with those in the body and at no time will they register with the ports in the body.

In the drawings:

Fig. 1 is a vertical longitudinal sectional view taken through a valve formed in accordance with the present invention and showing the same in a closed position;

Fig. 2 is a horizontal sectional view taken on the plane indicated by the line II—II of Fig. 1 and showing the plug in a position to provide for fluid flow;

Figure 4:
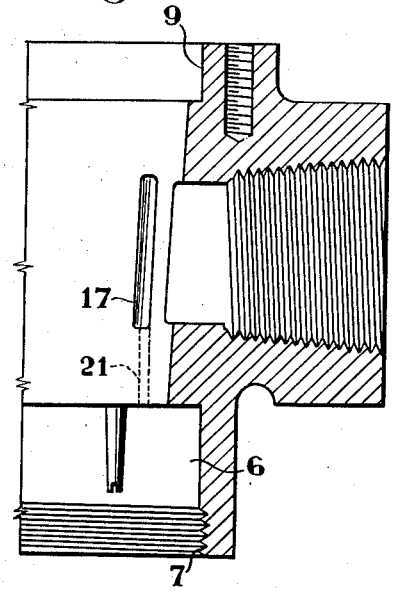
Figure 5:
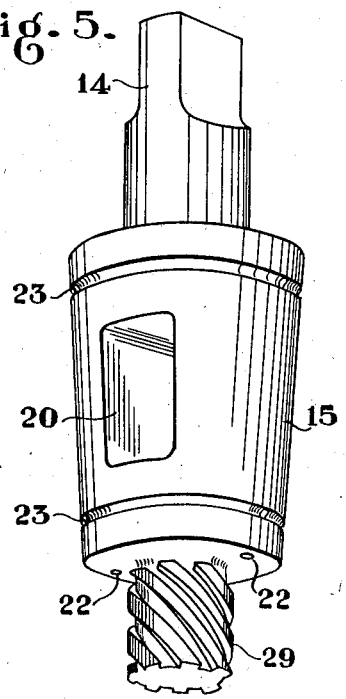

Fig. 3 is a detail horizontal sectional view taken on the plane indicated by the line III—III of Fig. 1;

Fig. 4 is a partial vertical sectional view taken through the casing of the valve shown in Fig. 1;

Fig. 5 is a perspective view of the plug used in the valve;

Fig. 6 is an enlarged detail vertical sectional view taken on the plane indicated by the line VI—VI of Fig. 1.

Figure 7:
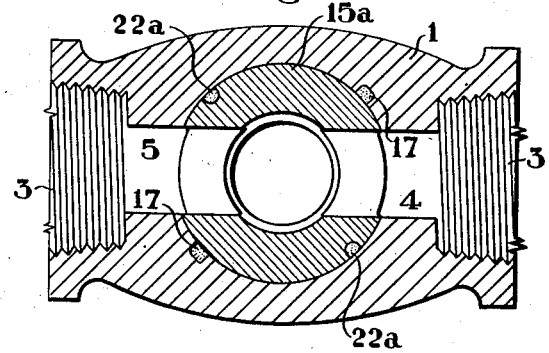

Fig. 7 is a horizontal sectional view taken through a slightly different form of valve, the plug being shown in a valve opening position.

Figure 8:
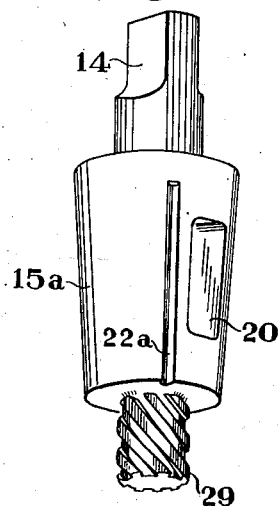

Fig. 8 is a perspective view of the plug used in the valve shown in Fig. 7.

Referring more particularly to the drawings, the numeral 1 designates the valve body. This member may be formed from cast iron or other suitable material and is provided with a longitudinally extending passage 2 having the ends threaded as at 3 for connecting the valve body in a pipe line. Between the threaded portions, the body is provided with a tapered socket which extends at right angles to the passage and divides the same into inlet and outlet ports 4 and 5. The lower end of the tapered socket connects with a lubricant receiving chamber 6 having a diameter somewhat greater than the largest diameter of the tapered socket. The lower end of the chamber 6 is threaded as at 7 to receive a cap member 8 which prevents the escape of the lubricant from the chamber.

The upper end of the tapered socket is counter-bored as at 9 to receive the circular extension 10 formed on a plug retaining gland 11. This member has a plurality of openings 12 through which bolts 13 extend to receive it to the body 1. The central portion of the member 11 has an opening formed therein through which the stem 14 of the valve plug 15 projects. The upper end of the stem is provided with flattened sides to form wrench receiving surfaces for the reception of a tool used to impart turning movement to the stem. Where the stem 14 connects to the plug, an annular shoulder 16 is formed for engagement by the lower surface of the extension 10. Thus, when the screws 13 are threaded into the valve body, the extension 10 will engage the shoulder 16 and force the valve plug into firm engagement with the walls of the socket.

As illustrated in Figs. 2 and 4, the socket wall has a pair of diametrically opposed lubricant receiving recesses 17 formed therein, these recesses terminating in spaced relation from the ends of the socket and being located on opposite sides of the longitudinal center of the passage 2. One of the ports is disposed in close proximity to the inlet side of the valve while the other is located adjacent to the outlet port.

As shown in Figs. 1 and 3, the stem 14 of the plug has a laterally directed projection 18 which is received in a slot 19 formed in the member 11. The slot 19 extends substantially 90 degrees around the opening for the stem and the end portions serve as stop means for the plug by engaging the sides of the projection 18. By reason of the shoulders at the ends of the slot, the plug will be limited to rotation through an angle of 90 degrees.

When the plug is in the position shown in Fig. 1, a transverse port 20 will be disposed crosswise of the valve body and communication between the inlet and outlet ports will be interrupted. After the plug has been rotated a distance sufficient to cause the engagement of the projection 18 with the other end of the slot 19, the plug will be in the position shown in Fig. 2 wherein the inlet and outlet ports will be connected by the port in the plug. At no time during the rotation of the plug will the port therein register with the recesses 17.

It will be noted in Fig. 4 that due to the termination of the recesses 17 in spaced relation from the ends of the socket, the wall of the socket will have uninterrupted end portions which form ring-like seats. The recesses are connected by means of bored openings 21 with the lubricant chamber at the lower end of the body. This chamber is also in communication with a pair of passageways 22 formed in the side portions of the plug and extending longitudinally thereof. The plug is formed as illustrated in Figs. 1 and 5 with annular grooves 23 in horizontal registration with the ring-like seats and laterally extending branch passages connect the passages 22 with the grooves 23. Thus when lubricant is introduced into the chamber 6, and pressure is applied to such lubricant, it will flow upwardly through the openings 21 to the recesses 17 and also quantities of the lubricant will flow through the passages 22 and the branches to the grooves 23. If sufficient pressure is applied, thin films of lubricant will flow from the grooves 23 into the minute spaces between the plug and the seats. Some of the lubricant will also flow from the grooves 17 into the space between the intermediate portion of the plug and the socket wall. When the plug is turned, this lubricant will serve to reduce the friction and permit ready operation of the valve.

To provide for the application of pressure to the lubricant, a piston 24 is disposed in the chamber 6 with the side wall thereof in wiping engagement with the side wall of the chamber. The piston is formed with guide openings 25 for the reception of guide pins 26 carried by the body 1 and projecting longitudinally of the chamber 6. These guide pins may be threaded into the body as illustrated at 27 or they may be secured thereto in other suitable manner. The pins 26 are of tapered formation, the largest end of the pin being disposed adjacent to the inner end of the chamber. The openings 25 have diameters corresponding substantially to the largest diameter of the guide pins so that as the piston approaches the inner end of the chamber, the space between the side walls of the guide openings and the pins will be reduced.

To move the piston in the chamber, the plug 15 has an extension 28 at its lower end which extension is disposed axially of the chamber 6. The outer surfaces of the extension are provided with spirally arranged screw threads 29 for the reception of similar threads formed in a central opening in the piston 24. Inasmuch as the piston is held against rotary movement by the guide pins, rotation of the plug will impart longitudinal movement to the piston. This movement takes place each time the plug is moved between open and closed positions. If the piston 24 is at the inner end of the chamber and the latter is filled with grease and the cap 8 replaced, rotation of the plug will cause the piston to move downwardly and compress the grease between the bottom surface of the piston and the cap 8. As the clearance between the guide pins and the openings increases, the lubricant will flow around the guide pins and into the upper portion of the chamber 6. Then when the plug is turned in the opposite direction, the lubricant will be forced upwardly into the passages 21 and 22. As the clearance between the guide pins and openings decreases, when the piston moves upwardly, the pressure on the grease in the passages will increase and some of the lubricant will be caused to flow between the plug and the socket as before described.

It is preferable to employ spiral threads of such character that the piston 24 will move toward the inner end of the chamber 6 when the plug is moved to a valve closing position. Due to the resistance to inward movement of the piston by the grease, the plug will be caused to seat firmly in the socket and any tendency for leakage to develop will be minimized. When the plug is turned in the opposite direction, the resistance offered by the grease to the movement of the piston will tend to unseat the plug, thus making the valve easier to operate when moved from a closed to an open position.

It will be noted from Figs. 1 and 5 that the pitch of the spiral threads 29 is such that the piston 24 will be caused to move substantially the full length of the chamber 6 when the plug is rotated through an angle of 90 degrees.

Through the construction above described, a valve has been provided which will be constantly lubricated through the application of pressure on a body of lubricant contained within the valve each time the valve is operated to control fluid flow therethrough. It is possible to remove the cap at the lower end of the valve body and insert the required amount of grease even when the valve is positioned in a line containing fluid under pressure. Due to the formation of the lubricant grooves and recesses and the constant application of pressure to the grease therein, the danger of fluid seepage through the valve or to the exterior will be reduced to a minimum.

In the form of valve shown in Figs. 7 and 8, the body is identical with that of the first form of valve described. The plug 15a, however, does not have internal lubricant passages nor the annular grooves but it is provided with a pair of longitudinally extending grooves 22a in the outer side surfaces. These grooves terminate in spaced relation from the upper end of the plug and extend completely to the lower end in order to be in communication with the lubricant chamber.

The grooves 22a are disposed adjacent to the ends of the transverse port 20 in the plug and are positioned on opposite sides of the longitudinal center of this port. These grooves are also so arranged on the plug that when the latter member is positioned in the body and located to establish communication between the inlet and outlet ports, the grooves 22a will be positioned on opposite sides of the inlet ports from the grooves 17 in the body and in a plane at right angles to the latter grooves.

When the plug is turned to interrupt fluid flow through the body, the grooves 22a will substantially register with the grooves 17. At no time during the movement of the plug will the grooves therein be exposed to the ports, the stop member 18 prevents movement of the plug to an extent which would permit the grooves 22a to be presented to the fluid passage through the valve. Such an arrangement is necessary since the lubricant in the grooves is under pressure and registration of the grooves with the port would permit the grease to be exhausted to the pipe line.

An advantage resulting from the construction set forth is that the lubricating medium will be constantly maintained in the grooves 22a under pressure and when the plug is rotated, the grease will be spread on the side walls of the socket. Another advantage resides in the fact that as the grooves 22a are formed in the plug, they will move with this member and when the valve begins to open or in trade parlance is "slightly cracked," smooth surfaces will be presented to the passing fluid.

While but a single form of valve has been illustrated and described, it is obvious that many minor changes may be made therein without departing from the spirit and scope of the invention as set forth in the following claims.

What is claimed is:

1. In a plug valve, a body formed with inlet and outlet ports and a tapered socket having a chamber at the smaller end, said socket establishing communication between said ports, the wall of said socket being formed with longitudinally extending recesses connected with said chamber, a tapered plug positioned in said socket for rotary adjustment, said plug having a transverse port to establish communication between the inlet and outlet ports when said plug is in one position of adjustment, a threaded extension on the smaller end of said plug, a piston disposed in said chamber and having an adjustable connection with said extension, guide means carried by said body and engaging said piston to prevent turning movement thereof whereby longitudinal movement will be imparted thereto when said plug is rotated, and removable cap means for providing access to said chamber to permit the insertion of lubricating medium, the movement of said piston in one direction in said chamber serving to force the lubricating medium into said recesses.

2. In a plug valve, a body formed with inlet and outlet ports and a tapered socket having a chamber at the smaller end, said socket establishing communication between said ports, the wall of said socket being formed with a longitudinally extending recess on one side of said inlet port and on the opposite side of said outlet port, a tapered plug positioned in said socket for rotary adjustment, said plug having a transverse port to establish communication between the inlet and outlet ports when said plug is in one position of adjustment, a threaded extension on the smaller end of said plug, a piston disposed in said chamber and having an adjustable connection with said extension, guide means carried by said body and engaging said piston to prevent turning movement thereof whereby longitudinal movement will be imparted thereto when said plug is rotated, and removable cap means for providing access to said chamber to permit the insertion of lubricating medium, the movement of said piston in one direction in said chamber serving to force the lubricating medium into said recesses.

3. In a plug valve, a body formed with inlet and outlet ports and a tapered socket having a chamber at the smaller end, said socket establishing communication between said ports, the wall of said socket being formed with longitudinally extending recesses connected with said chamber, a tapered plug positioned in said socket for rotary adjustment, said plug having a transverse port to establish communication between the inlet and outlet ports when said plug is in one position of adjustment, a threaded extension on the smaller end of said plug, means carried by said body to hold said plug against longitudinal movement in said socket, a piston having internal threads adjustably disposed on said extension, guide pins carried by said body and extending through said piston to resist rotation thereof, turning movement of said plug causing longitudinal movement of said piston, and cap means removably secured to said body to provide access to said chamber to permit the insertion of a lubricating medium, movement of said piston toward said plug serving to force lubricating medium into said recesses.

4. In a plug valve, a body formed with inlet and outlet ports and a tapered socket having a chamber at the smaller end, said socket establishing communication between said ports, the wall of said socket being formed with a longitudinally extending recess on one side of said inlet port and on the opposite side of said outlet port, a tapered plug positioned in said socket for rotary adjustment, said plug having a transverse port to establish communication between the inlet and outlet ports when said plug is in one position of adjustment, means carried by said valve body to limit the degree of rotation of said plug and prevent the registration of the transverse port with said recesses, a threaded extension on the smaller end of said plug, a piston disposed in said chamber and having an adjustable connection with said extension, guide means carried by said body and engaging said piston to prevent turning movement thereof whereby longitudinal movement will be imparted thereto when said plug is rotated, and removable cap means for providing access to said chamber to permit the insertion of lubricating medium, the movement of said piston in one direction in said chamber serving to force the lubricating medium into said recesses.

5. In a valve of the type having a body formed with inlet and outlet ports and a tapered plug rotatably disposed in a socket in said body to control communication between the ports, a lubricant chamber formed in the valve body at the smaller end of the plug, lubricant receiving grooves formed in the side wall of the plug socket and joined at one end with said chamber, piston means mounted for longitudinal movement in said chamber, and motion transmitting means connecting said valve plug and piston whereby rotary movement of the former will cause longitudinal movement of the latter.

6. In a valve of the type having a body formed with inlet and outlet ports and a tapered plug rotatably disposed in a socket in said body to control communication between the ports, a lubricant chamber formed in the valve body at the smaller end of the plug, lubricant receiving grooves formed in the side wall of the plug socket and joined at one end with said chamber, piston means mounted for longitudinal movement in said chamber, and screw thread means for transmitting movement from said plug to said piston whereby rotary movement of the former will cause longitudinal movement of the latter, the pitch of such screw thread means being such that said piston will move substantially the full length of said chamber upon 90 degrees of rotation of said plug.

7. In a valve of the type having a body formed with inlet and outlet ports and a tapered plug rotatably disposed in a socket in said body to control communication between the ports, a lubricant chamber formed in the valve body at the smaller end of the plug, lubricant receiving grooves formed in the side wall of the plug socket and joined at one end with said chamber, piston means mounted for longitudinal movement in said chamber, said piston having guide openings formed therein, guide pins carried by the valve body and disposed in the openings in said piston to resist rotary movement thereof, and motion transmitting means connecting said valve plug and piston and providing for longitudinal movement of the latter when rotary movement is imparted to the former.

8. In a valve of the type having a body formed with inlet and outlet ports and a tapered plug rotatably disposed in a socket in said body to control communication between the ports, a lubricant chamber formed in the valve body at the smaller end of the plug, lubricant receiving grooves formed in the side wall of the plug socket and joined at one end with said chamber, piston means mounted for longitudinal movement in said chamber, said piston having guide openings formed therein, tapered guide pins carried by the valve body and disposed in the openings in said piston to resist rotary movement thereof, and motion transmitting means connecting said valve plug and piston and providing for longitudinal movement of the latter when rotary movement is imparted to the former, the taper of said guide pins serving to reduce the clearance between the guide openings and pins as the piston approaches the smaller end of the plug.

9. A plug valve comprising a body having inlet and outlet ports and a tapered socket between said ports, said body having a chamber at the small end of said socket and a pair of diametrically opposed lubricant receiving recesses, said recesses terminating in spaced relation from the ends of said socket to provide continuous annular seats, said body having passages to establish communication between said chamber and said recesses, a plug positioned for turning movement in said socket, said plug having a transverse port to connect said inlet and outlet ports when said plug is in one position of adjustment, a passage extending longitudinally of said plug and communicating with said chamber at one end, a plurality of lateral branch passages extending from said longitudinal passage to the exterior of said plug in registration with the annular seats in said body, a piston disposed for longitudinal adjustment in said chamber, and means connecting said piston to said plug whereby rotation of the latter will cause longitudinal movement of the former in said chamber, movement of said piston in one direction serving to force a lubricating substance into said recesses and said passages.

10. A plug valve comprising a body having inlet and outlet ports and a tapered socket between said ports, said body having a chamber at the small end of said socket and a pair of diametrically opposed lubricant receiving recesses, said recesses terminating in spaced relation from the ends of said socket to provide continuous annular seats, said body having passages to establish communication between said chamber and said recesses, a plug positioned for turning movement in said socket, said plug having a transverse port to connect said inlet and outlet ports when said plug is in one position of adjustment, a piston disposed for longitudinal adjustment in said chamber, and means connecting said piston to said plug whereby rotation of the latter will cause longitudinal movement of the former in said chamber, movement of said piston in one direction serving to force a lubricating substance into said recesses.

11. A plug valve comprising a body having inlet and outlet ports and a tapered socket between said ports, said body having a chamber at the small end of said socket and a pair of diametrically opposed lubricant receiving recesses, said recesses terminating in spaced relation from the ends of said socket to provide continuous annular seats, said body having passages to establish communication between said chamber and said recesses, a plug positioned for turning movement in said socket, said plug having a transverse port to connect said inlet and outlet ports when said plug is in one position of adjustment, a passage extending longitudinally of said plug and communicating with said chamber at one end, a plurality of lateral branch passages extending from said longitudinal passage to the exterior of said plug in registration with the annular seats in said body, annular grooves encircling said plug in registration with said branch passages, a piston disposed for longitudinal adjustment in said chamber, and means connecting said piston to said plug whereby rotation of the latter will cause longitudinal movement of the former in said chamber, movement of said piston in one direction serving to force a lubricating substance into said recesses and said passages.

HOMER J. WADDELL.